US011383980B2

(12) United States Patent
Dhiba et al.

(10) Patent No.: US 11,383,980 B2
(45) Date of Patent: Jul. 12, 2022

(54) CALCIUM SULFIDE DECOMPOSITION PROCESS

(71) Applicant: OCP SA, Casablanca (MA)

(72) Inventors: Driss Dhiba, Casablanca (MA); Lhoussaine Omari, Safi (MA); Jamal Chaouki, Quebec (CA); Ahmad Mohaddespour, Quebec (CA)

(73) Assignee: OCP SA

( * ) Notice: Subject to any disclaimer, the term of this patent is extended or adjusted under 35 U.S.C. 154(b) by 124 days.

(21) Appl. No.: 16/766,461

(22) PCT Filed: Nov. 22, 2018

(86) PCT No.: PCT/MA2018/000018
§ 371 (c)(1),
(2) Date: May 22, 2020

(87) PCT Pub. No.: WO2019/103585
PCT Pub. Date: May 31, 2019

(65) Prior Publication Data
US 2021/0261412 A1 Aug. 26, 2021

(30) Foreign Application Priority Data
Nov. 22, 2017 (EP) .................................... 17203183

(51) Int. Cl.
*C01B 17/00* (2006.01)
*C01B 17/50* (2006.01)
*C01B 32/40* (2017.01)
*C01F 11/10* (2006.01)

(52) U.S. Cl.
CPC ............ *C01B 17/501* (2013.01); *C01B 32/40* (2017.08); *C01F 11/10* (2013.01)

(58) Field of Classification Search
CPC ......... C01B 17/501; C01B 32/40; C01F 11/10
See application file for complete search history.

(56) References Cited

U.S. PATENT DOCUMENTS 3,087,790 A 4/1963 Wheelock et al.
3,729,551 A * 4/1973 Gorin ...................... C01B 17/44 423/638
4,102,989 A * 7/1978 Wheelock ............... C01F 11/08 423/541.1
4,216,197 A * 8/1980 Moss ...................... C01F 11/10 423/638
4,503,018 A 3/1985 Gardner et al.
5,433,939 A 7/1995 Wheelock
6,024,932 A 2/2000 Paisley
6,083,862 A 7/2000 Wheelock

OTHER PUBLICATIONS

Lynch DC, Elliott JF. Analysis of the oxidation reactions of CaS. Metallurgical Transactions B. Sep. 1, 1980;11(3):415-25.
S'habou R, Zairi, Ben Dhia H. Characterisation and environnemental impacts of olive oil wastewater disposal. Environmental technology. Jan. 1, 2005;26(1):35-45.
Torres-Ordonez RJ, Longwell JP, Sarofim AF. Physical transformations during solid calcium sulfide oxidation. Energy & Fuels. Sep. 1, 1989;3(5):595-603.
Cárdenas-Escudero C, Morales-Flórez V, Pérez-López R, Santos A, Esquivias L. Procedure to use phosphogypsum industrial waste for mineral CO2 sequestration. Journal of hazardous materials. Nov. 30, 2011;196:431-5.
Wu S, Uddin MA, Nagamine S, Sasaoka E. Role of water vapor in oxidative decomposition of calcium sulfide. Fuel Apr. 1, 2004;83(6):671-7.
Qiu K, Anthony EJ, Jia L. Oxidation of sulfided limestone under the conditions of pressurized fluidized bed combustion. Fuel. Mar. 1, 2001;80(4):549-58.
Anthony EJ, Jia L, Qiu K. CaS oxidation by reaction with CO2 and H2O. Energy & fuels. Mar. 19, 2003;17(2):363-8.
García B, Yamazaki Y, Takarada T. Oxidation behavior of CaS produced from Ca ion-exchanged coal. Fuel. Jun. 1, 1999;78(8):883-90.
Extended European Search Report including Written Opinion for EP17203183.3 completed Apr. 12, 2018; 7 pages.
International Search Report including Written Opinion for PCT/MA2018/000018 dated Jan. 3, 2019; 13 pages.

* cited by examiner

*Primary Examiner* — Steven J Bos
(74) *Attorney, Agent, or Firm* — Lerner, David, Littenberg, Krumholz & Mentlik, LLP

(57) ABSTRACT

The present invention relates to a process for decomposing calcium sulfide (CaS) into calcium oxide (CaO) and sulfur dioxide ($SO_2$), comprising:—providing a reactor containing calcium sulfide and a source of carbon,—oxidizing the source of carbon so as to generate carbon dioxide ($CO_2$),—reacting the calcium sulfide with said carbon dioxide so as to produce carbon oxide (CaO), sulfur dioxide ($SO_2$) and carbon monoxide (CO) according to the following reaction: $CaS+3CO_2 \sim CaO+SO_2+3CO$ wherein the oxygen and carbon contents in the oxidation step are chosen such that: (i) the mass ratio C/CaS is comprised between 0.15 and 0.35 and (ii) the mass ratio $O_2/C$ is comprised between 5 and 25.

8 Claims, 4 Drawing Sheets

(a)

(b)

(a)

(b)

CALCIUM SULFIDE DECOMPOSITION PROCESS

CROSS-REFERENCE TO RELATED APPLICATIONS

The present application is a national phase entry under 35 U.S.C § 371 of International Application No. PCT/MA2018/000018 filed Nov. 22, 2018, which claims priority from European Application No. 17203183.3 filed Nov. 22, 2017, all of which are hereby incorporated herein by reference.

FIELD OF THE INVENTION

The invention relates to a method for decomposing calcium sulfide into calcium oxide and sulfur dioxide using carbon oxidation under the controlled oxygen stoichiometry for the total carbon dioxide and energy requirements for the decomposition process.

BACKGROUND OF THE INVENTION

Calcium sulfide (CaS) is one of the main by-products of phosphogypsum (PG) decomposition under reduction [1,2] and, thus, considerable efforts have been made to avoid its presence in the solid products of the phosphogypsum decomposition process [3,4].

Disposing of CaS into the environment can result in $H_2S$ release from the reaction between CaS and water [5].

Converting CaS to $CaSO_4$ or CaO under oxidizing conditions is one of the solutions, however, there are some limitations. First, under oxidizing circumstances, CaS yields two different solid products:

$$CaS+1.5O_2 \rightarrow CaO+SO_2 \quad (1)$$

$$CaS+2O_2 \rightarrow CaSO_4 \quad (2)$$

Whether reaction (1) or (2) occurs depends on the reaction conditions [6]. For example, at high $O_2$ concentration and high temperature, $CaSO_4$ is formed. If a layer of $CaSO_4$ covers the outside of CaS particles, then, CaS is not converted to $CaSO_4$ until $CaSO_4$ is decomposed into CaO, $SO_2$ and $O_2$ at high temperature (above 1200° C.) [7]:

$$CaSO_4 \rightarrow CaO+SO_2+0.5O_2 \quad (3)$$

Using carbon dioxide for PG decomposition as the reacting gas with $CO_2/CO \approx 5-6$ has been shown to remarkably reduce the amounts of CaS [8-10].

Other methods considered an oxidation step for CaS conversion to $CaSO_4$ while it was combined with a reduction step to reconvert $CaSO_4$ to CaO and $SO_2$ [3, 4]. This process, however, has some drawbacks. For example, only an outer layer of CaS particles is oxidized to $CaSO_4$ and subsequently reduced to CaO, yielding a low CaS conversion. Therefore, a large particle recirculation rate between the oxidation and reduction reactors is required. Nevertheless, the proposed processes require a very high heating rate to maintain the reactor temperature between 950-1200° C.

Secondly, another limitation making CaS decomposition not economically viable by the above mentioned processes is the considerably high energy demands. All decomposition reactions occur above 1100° C., hence providing the heat required to keep the reactor at this temperature is remarkably significant.

BRIEF DESCRIPTION OF THE INVENTION

A goal of the invention is to provide a process for decomposing CaS in which not only the required energy is provided, but also favorable CaS conversion to CaO and $SO_2$ occurs.

Accordingly, the invention provides a process for decomposing calcium sulfide (CaS) into calcium oxide (CaO) and sulfur dioxide ($SO_2$). The process is primarily characterized in that it comprises:

- providing a reactor containing calcium sulfide and a source of carbon,
- oxidizing the source of carbon so as to generate carbon dioxide ($CO_2$),
- reacting the calcium sulfide with said carbon dioxide so as to produce calcium oxide (CaO), sulfur dioxide ($SO_2$) and carbon monoxide (CO) according to the following reaction:

$$CaS+3CO_2 \rightarrow CaO+SO_2+3CO$$

wherein the oxygen and carbon contents in the oxidation step are chosen such that:

(i) the mass ratio C/CaS is comprised between 0.15 and 0.35 and (ii) the mass ratio $O_2$/C is comprised between 5 and 25.

Calcium oxide can be recycled to the in-bed removal of the $H_2S$ process while $SO_2$ can be used for sulfuric acid production.

The oxidation reaction of carbon (C) into carbon monoxide (CO) then carbon dioxide $C0_2$ is exothermic.

The process of the invention uses the carbon dioxide $CO_2$ and the energy produced by this exothermic reaction to carry out the reaction of decomposition of the calcium sulfide CaS, which is an endothermic reaction.

An essential condition is to have over-stoichiometric conditions of $O_2$ and sub-stoichiometric conditions of C, so as to favor the oxidation of C into $CO_2$ and to limit the reaction of CaS with other species than carbon dioxide $CO_2$. This condition is achieved with mass ratios C/CaS comprised between 0.15 and 0.35 and $O_2$/C comprised between 5 and 25.

According to other optional characteristics of the invention:

- the ratio C/CaS is preferably equal to 0.25;
- the ratio $O_2$/C is preferably equal to 8;
- in the oxidation step, the reactor is heated to a temperature comprised between 900° C. and 1200° C., preferably around 1100° C.;
- the reactor is advantageously heated by induction. However, it can also be heated by another external source such as a source of electricity;
- the source of carbon comprises at least one of: coal, coke, charcoal, and shale oil;
- the reactor is preferably a continuous reactor, such as a fluidized bed reactor or a rotary kiln, and comprises an inlet and an outlet for flowing $O_2$ through the calcium sulfide and the source of carbon.

BRIEF DESCRIPTION OF THE DRAWINGS

Further features and advantages of the invention will be apparent from the detailed description that follows, based on the appended drawings wherein.

DETAILED DESCRIPTION OF EMBODIMENTS OF THE INVENTION

The invention relates to CaS decomposition by carbon (e.g., coal, coke, charcoal, or any other source of carbon) oxidation ($O_2$ above stoichiometry conditions) to remove any undesired CaS produced from PG decomposition reactions or any other processes and convert it to CaO and $SO_2$.

Calcium sulfide decomposition can be performed in an oxidative environment at 1100° C. as mentioned in reactions (1) and (2):

$$CaS+1.5O_2 \rightarrow CaO+SO_2 \quad (1)$$

$$CaS+2O_2 \rightarrow CaSO_4 \quad (2)$$

However, it could lead to $CaSO_4$ formation requiring further treatment of the solid.

Another process at 1100° C. that can be used for CaS decomposition employs $CO_2$ according to:

$$CaS+3CO_2 \rightarrow CaO+3CO+SO_2 \quad (4)$$

Figure 1:
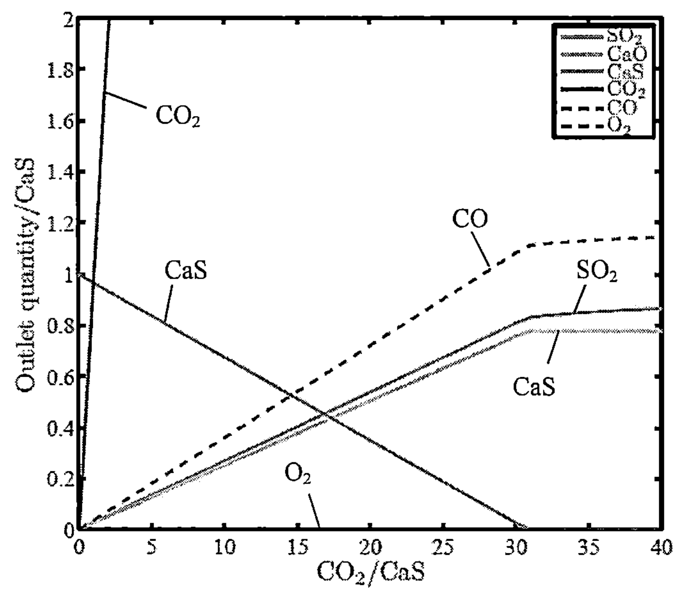
FIG. 1 relates to calcium sulfide decomposition using $CO_2$: (a) dimensionless outlet quantities per unit of CaS— and (b) energy requirement for the mass unit of CaS. The dashed line in (b) shows the required $CO_2$/CaS when CaS conversion is complete. The data are obtained by equilibrium calculation using FactSage™ simulations.
Figure 1:
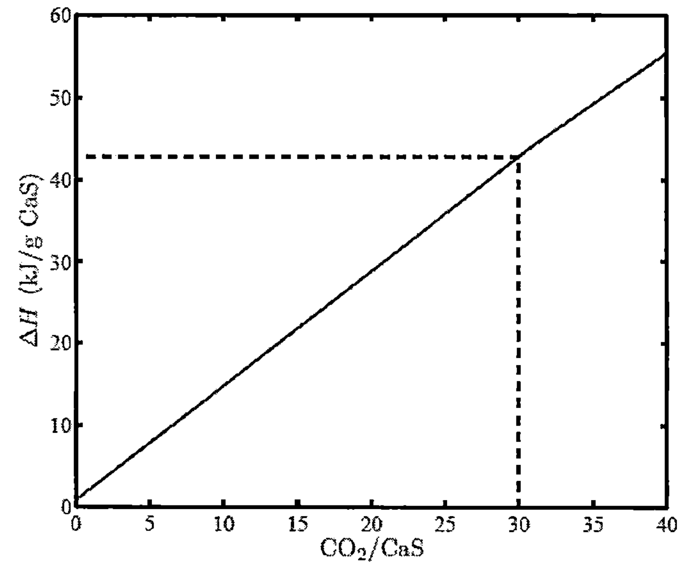

Note that this requires $CO_2$/CO≈30 for a complete CaS conversion (see FIG. 1(*a*)). A complete CaS removal by high $CO_2$ flow in the inlet of the reactor can cause particle entrainment. When using a fluidized bed reactor, high $CO_2$ flow can cause the particle discharge, which not only affects the reaction kinetics but also requires massive filtration. About 95% of the injected $CO_2$ is discharged from the reactor, which can yield serious environmental impacts. Moreover, the process of using $CO_2$ requires considerable amounts of energy (≈42 kJ/g CaS, FIG. 1(*b*)). As a result, this method is not recommended for a complete CaS conversion.

Carbon as the source of energy under oxidizing conditions undergoes the two following reactions:

$$C+0.5O_2 \rightarrow CO \quad (5)$$

$$C+O_2 \rightarrow CO_2 \quad (6)$$

where these reactions are exothermic. Calcium sulfide does not directly react with carbon. However, CaS can be converted to CaO and $SO_2$ according to $$CaS+3CO_2 \rightarrow CaO+SO_2+3CO \quad (7)$$

Among the products of reaction (7), CaO and CO do not react with CaS while $SO_2$ can react with CaS and produce $CaSO_4$:

$$CaS+2SO_2 \rightarrow CaSO_4+2S \quad (8)$$

Then, various reactions can occur between CaS and $CaSO_4$, thereby leading to desired solid and gas products:

$$3CaSO_4+CaS \rightarrow 4CaO+4SO_2 \quad (9)$$

$$CaSO_4+3CaS \rightarrow 4CaO+4S \quad (10)$$

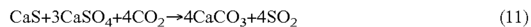

$$CaS+3CaSO_4+4CO_2 \rightarrow 4CaCO_3+4SO_2 \quad (11)$$

$$CaS+3SO_3 \rightarrow CaO+4SO_2 \quad (12)$$

With sufficient amounts of carbon and controlled amounts of oxygen, carbon can produce the required amounts of energy and, simultaneously, the required amount of $CO_2$ to initiate the CaS decomposition process. Therefore, in continuous streams of CaS and carbon, while oxygen is injected, all reactions occur with the heat provided by carbon combustion.

The present invention is illustrated in further detail below by non-limiting examples and embodiments.

Pure CaS (%99.99, particle diameter $20<d_p<60$ μm, ρ≈2.6 g/cm³) was provided by Sigma-Aldrich, USA, and coal (particle diameter $20<d_p<60$ μm) as a source of carbon was provided by Recommunity Inc., Canada, with the heating value of 28,280 kJ/Kg and characterized by CHNS (determination of the mass fractions of carbon (C), hydrogen (H), nitrogen (N) and sulfur (S)) and NAA (Neutron Activation Analysis) presented in tables 5 and 6 below, respectively.

CaS decomposition experiments by carbon oxidation were performed in a novel, heat-induced fluidized bed reactor that was able to be heated up to 1100° C. at 200° C./s.

Figure 2:
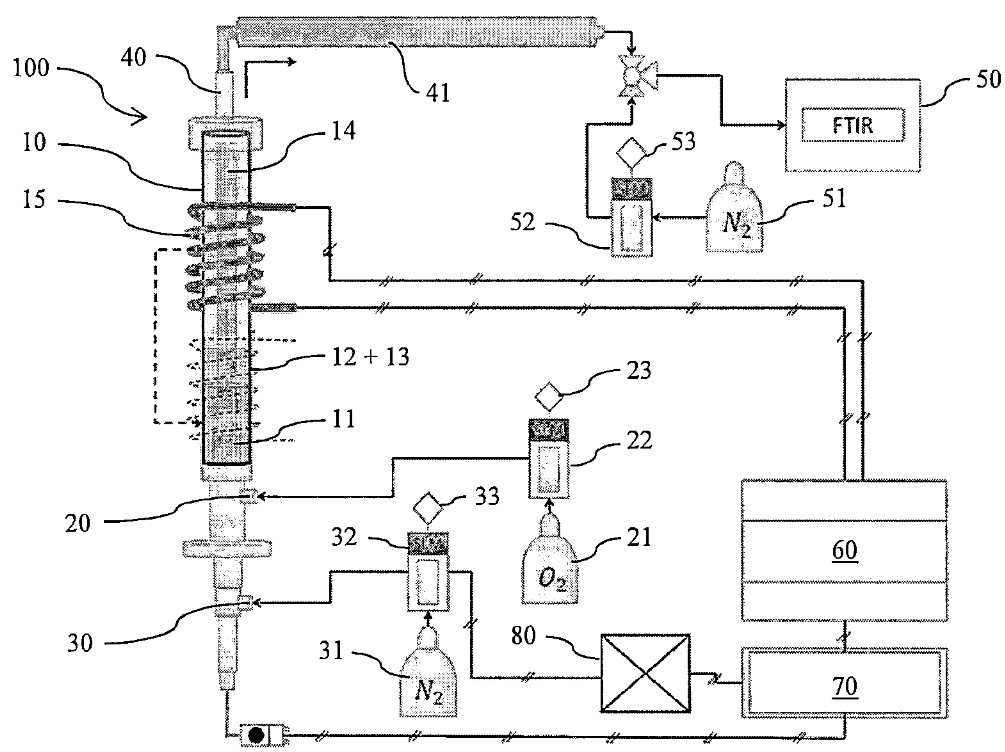
FIG. 2 illustrates an induced heated fluidized bed reactor scheme for gypsum decomposition experiments by carbon oxidation.

The scheme of a reaction device 100 comprising this reactor 10 is illustrated in FIG. 2.

The reactor 10 comprises a gas inlet 20 from which oxygen $O_2$ (reacting gas) is supplied to the reactor. An oxygen source 21 in communication with a digital flow controller 22 powered by a power supply 23 allows to control the flow of oxygen $O_2$ being introduced into the reactor 10.

Similarly, the reactor 10 comprises a gas inlet 30 from which nitrogen $N_2$ (carrier gas) is supplied to the reactor. A nitrogen source 31 in communication with a digital flow controller 32 powered by a power supply 33 allows to control the flow of nitrogen being introduced into the reactor 10.

The gases leave the reactor via the gas outlet 40 which comprises a thermal and/or electrical insulation 41.

An analysis device 50, such as an FTIR spectrometer (Fourier Transform InfraRed) can be used to analyze the gases leaving the reactor, in order to collect data from which infrared spectrum, emission spectrum or absorption spectrum, for example, are obtained. A nitrogen source 51 in communication with a digital flow controller 52 powered by a power supply 53 are provided for this purpose.

The reactor 10 is formed of a tube, preferably made of alumina, loaded with sand 11, and phosphogypsum 12 and coal 13, prior to the reaction. Within the reactor 10, stainless steel vertical rods 14 are fixed to a plate. A metal coil 15, preferably a copper coil, is wrapped around the tube of the reactor 10 and supplied with energy by an induction heating power supply 60. The temperature is the reactor is controlled by a temperature controller 70. The reaction device 100 is advantageously provided with a Data Acquisition System 80 (DAS or DAQ) for sampling signals of various experimental parameters and converting them into computer processable values.

The flow of nitrogen $N_2$ and oxygen $O_2$ with predetermined rates fluidize the material inside the tube so that it provides the minimum fluidization conditions, which is achieved by synchronizing the flow rates and the temperature inside the reactor 10 measured by thermocouples. However, the ratio between nitrogen $N_2$ and oxygen $O_2$ is kept constant by the digital flow controller 22

The current flow (which changes direction with a very high frequency) in the metal coil 15 induces a magnetic field so that the direction of said magnetic field also changes with a very high frequency. The stainless steel rods 14 act as conductors where the current is induced by the magnetic field. As a consequence, heat is released by Joule effect inside the tube of the reactor 10 surrounded by the metal coil 15.

Example—Optimum carbon and $O_2$ for CaS decomposition to $SO_2$ and CaO

The $CO_2$ required to react with CaS and produce $SO_2$ and CaO is provided by carbon combustion. Therefore, oxygen should be above stoichiometry to assure enough amounts of $CO_2$ production. Low oxygen content yields CO formation, which does not react with CaS. As a result, the oxygen amount injected into the reactor should at least fulfill energy requirements for all decomposition reactions. Then, the produced $CO_2$ can initiate CaS initial conversion to $SO_2$ and CaO as follows:

$$CaS+3CO_2 \rightarrow CaO+SO_2+3CO \quad (7)$$

On the other hand, if the injected oxygen is too high, although the released energy would be higher, it yields large amounts of $CO_2$ production, which can lead to $CaSO_4$ formation instead of CaO and $SO_2$ according to the following reaction:

$$CaS+2O_2 \rightarrow CaSO_4 \quad (13)$$

Figure 3:
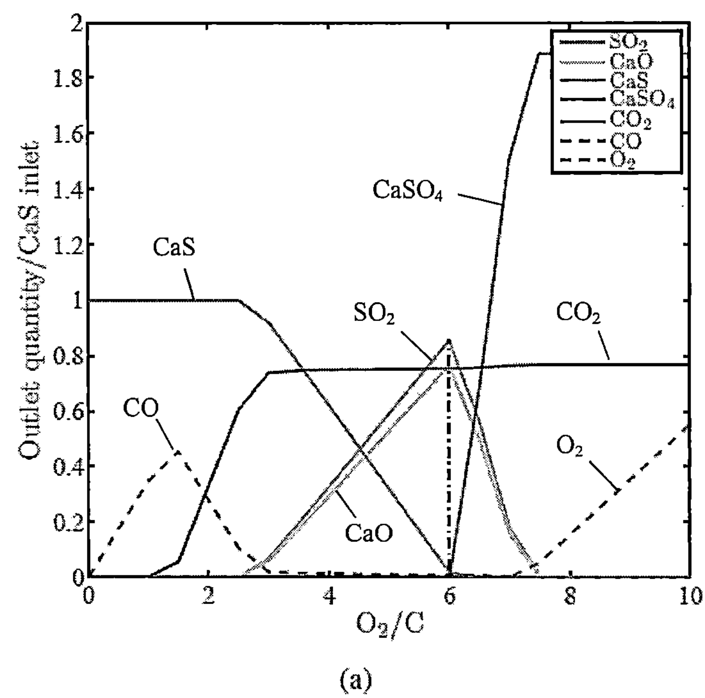
FIG. 3 relates to calcium sulfide decomposition using carbon combustion when C/CaS≈0.2: (a) dimensionless outlet quantities and (b) energy requirement for the mass unit of CaS. The dashed line in (b) shows the optimum $O_2$/C when CaO and $SO_2$ yields are maximum. The data are obtained by equilibrium calculation using FactSage™ simulations.
Figure 3:
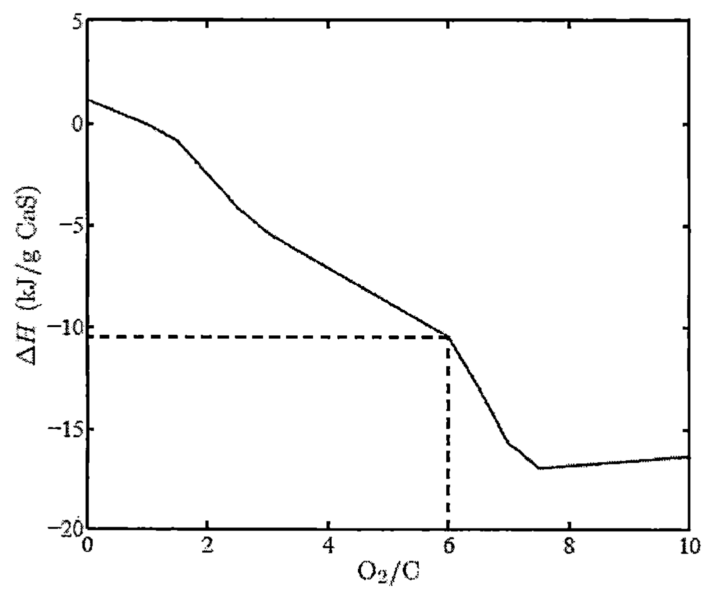

Therefore, oxygen should be optimized for this process. FactSage™ simulation results provided in FIG. 3(*a*) and (*b*) show that the heat provided by carbon combustion when C/CaS≈0.2 and $O_2$/C≈6 provides ample heat (≈10.5 kJ/g CaS), which also can be used for preheating the solid feed and the oxidizing gas before the decomposition reactor.

In general, the following four series of reactions take place in order as the process starts. Step one includes carbon combustion and CaS oxidation in the presence of oxygen:

$$C+0.5O_2 \rightarrow CO \quad (5)$$

$$C+O_2 \rightarrow CO_2 \quad (6)$$

$$CaS+1.5O_2 \rightarrow CaO+SO_2 \quad (14)$$

$$CaS+2O_2 \rightarrow CaSO_4 \quad (13)$$

in which reaction (6) with respect to reaction (5) is the most probable phenomenon due to the high concentration of oxygen in the reactor. Although the oxygen is under control, the side reaction (13) occurs unfavorably compared to reaction (14). In step two after $CaSO_4$ production, however negligible, the following series of reactions occur not only between $CaSO_4$ and CaS, but also with carbon, which ultimately helps the favorable production of CaO and $SO_2$:

$$CaSO_4+CO \rightarrow CaO+SO_2+CO_2 \quad (15)$$

$$CaSO_4+4CO \rightarrow CaS+CO_2 \quad (16)$$

$$2CaSO_4+C \rightarrow 2CaO+2SO_2+CO_2 \quad (17)$$

$$CaSO_4+4C \rightarrow CaS+4CO \quad (18)$$

and also $$3CaSO_4+CaS \rightarrow 4CaO+4SO_2 \quad (19)$$

$$CaSO_4+3CaS \rightarrow 4CaO+4S \quad (20)$$

$$CaS+3CaSO_4+4CO_2 \rightarrow 4CaCO_3+4SO_2 \quad (21)$$

$$CaS+3SO_3 \rightarrow CaO+4SO_2 \quad (22)$$

Thus, for unfavorable $CaSO_4$ removal, it is not necessary to add an oxidizing step similar to old processes [4] because $CaSO_4$ is converted to either CaS or desired products by the CO produced from either carbon oxidation (reaction 5) or $CaSO_4$—C solid-solid reaction (18). Consequently, CaS can be decomposed to CaO and $SO_2$ by a carbon oxidation process where $O_2$/C≈6 and C/CaS≈0.2. The energy required for all the decomposition reactions is provided with carbon oxidation at 1100° C., thereby requiring no external energy.

For the experiments performed in the fluidized bed reactor, initial conditions of the feed are summarized in Table 1 below. The results of all experiments are also summarized in Table 2, which is described in the next two sections.

TABLE 1

Inlet properties of fluidized bed experiments in the heat-induced fluidized bed reactor illustrated in FIG. 2 at 1100° C.

| Inlet property | | | |
|---|---|---|---|
| C/CaS | 0.15 | 0.25 | 0.35 |
| CaS (g) | 5.22 | 4.80 | 4.44 |
| C (g) | 0.78 | 1.20 | 1.56 |
| $O_2$/PG | 2, 3, 4 | 2, 3, 4 | 2, 3, 4 |

Note that coal was used as a source of carbon in all experiments.

TABLE 2

CaS conversion, CaO yield, and $CaSO_4$ yield (corresponding to each cell from left to right) in a fluidized bed reactor at 1100° C. with the initial conditions summarized in Table 1 and XPS analysis summarized in Tables 3 and 4.

| | $O_2$/CaS | | |
|---|---|---|---|
| C/CaS | 2 | 3 | 4 |
| 0.15 | | 0.83, 0.55, 0.22 | |
| 0.25 | 0.85, 0.75, 0.02 | 0.93, 0.83, 0.08 | 0.96, 0.67, 0.28 |
| 0.35 | | 0.85, 0.77, 0.03 | |

Table 3 shows the effect of C/CaS variation with constant $O_2$/CaS (≈3, which is considered to be optimum).

When C/CaS≈0.15, $O_2$/CaS≈3 yields more $CO_2$ production than CO according to the following reactions:

$$C+0.5O_2 \rightarrow CO \quad (5)$$

$$C+O_2 \rightarrow CO_2 \quad (6)$$

Moreover, according to the $O_2$ abundance, the two following reactions also occur:

$$CaS+1.5O_2 \rightarrow CaO+SO_2 \quad (14)$$

$$CaS+2O_2 \rightarrow CaSO_4 \quad (13)$$

which result in $CaSO_4$ formation undergoing reactions (15) to (22) afterwards. As a result, CaS conversion is not high enough when C/CaS≈0.15 since CaS is reproduced at some stages or does not fully react with $CO_2$ because of a carbon shortage.

The remarkable feature of this series of reactions is that CO is produced from two reactions under any circumstances:

$$CaS+3CO_2 \rightarrow CaO+SO_2+3CO \quad (7)$$

$$C+0.5O_2 \rightarrow CO \quad (5)$$

or even from $$CaSO_4+4C \rightarrow CaS+4CO \quad (18)$$

providing the formation of $CaSO_4$. The CO formation plays a significant role in obtaining high CaS conversion, because when CaS reacts with oxygen, $CaSO_4$ formation is inevitable as a layer around CaS particles. The CO production according to the above mentioned reactions, in this case, reacts with $CaSO_4$ and converts it to CaO and $SO_2$. Therefore, CaS particles would again find the opportunity to be in contact with $CO_2$ and $O_2$ molecules and undergo decomposition reactions.

By increasing the carbon in the feed from C/CaS≈0.15 to 0.25 and since oxygen is at the optimum value required to produce a sufficient amount of $CO_2$ to react with CaS, the conversion of CaS increases while $CaSO_4$ formation is almost halted by the fast reaction of carbon and oxygen. The $CO_2$ formation at this stage would favor the following reaction to its maximum extent:

$$CaS+3CO_2 \rightarrow CaO+SO_2+3CO \quad (7)$$

However, when carbon in the feed increases to C/CaS≈0.35, the injected $O_2$/C would be under the optimum value, thereby producing more CO instead of $CO_2$. Under these circumstances, the oxygen partially reacts with CaS and produces CaO and $SO_2$ along with $CaSO_4$. According to the higher CO formation compared to that of C/CaS≈0.25, $CaSO_4$ yield is lowest in this case because a high amount of CO formation favors $CaSO_4$ conversion to the other products.

TABLE 3

Effects of C/CaS ratio on the remaining solid composition in a fluidized bed reactor at 1100° C. by XPS analysis with the initial conditions summarized in Table 1 when $O_2$/CaS ≈ 3.

| C/CaS | CaS (mol. %) | CaO (mol. %) | $CaSO_4$ (mol. %) | CaS conversion (≈%) | CaO yield (≈%) | $CaSO_4$ yield (≈%) |
|---|---|---|---|---|---|---|
| 0.15 | 7.2 | 66.2 | 26.5 | 83 | 55 | 22 |
| 0.25 | 2.1 | 89.2 | 8.6 | 93 | 83 | 8 |
| 0.35 | 7.8 | 88.7 | 3.3 | 85 | 77 | 3 |

Table 4 shows the effects of $O_2$/CaS variations with constant C/CaS (≈0.25, which is considered to be optimum).

For C/CaS≈0.25, the optimum $O_2$/CaS is ≈3.

Any lower amounts of oxygen in the feed favor CO production rather than $CO_2$.

Note that CaS does not react with CO directly but with $CO_2$.

As a result, partial CaS reaction with $CO_2$ favors CaO and $SO_2$ production, however, $CaSO_4$ is also converted to the desired products as a result of a reaction with CO.

On the other hand, any other amounts of oxygen larger than that of $O_2$/CaS≈3 would result in the partial production of $CaSO_4$ according to $CaS+2O_2 \rightarrow CaSO_4$.

However, a large oxygen presence yields CaS decomposition to desired products as well.

Thus, CaS total conversion increases at this stage while $CaSO_4$ yield also noticeably increases.

In other words, at high oxygen values more than the optimum required in the feed, CaS total conversion increases, although this increase does not culminate into the formation of desired products.

TABLE 4

Effects of $O_2$/CaS ratio on the remaining solid composition in a fluidized bed reactor at 1100° C. by XPS analysis with the initial conditions summarized in Table 1 when C/CaS ≈ 0.25.

| $O_2$/CaS | CaS (mol. %) | CaO (mol. %) | $CaSO_4$ (mol. %) | CaS conversion (≈%) | CaO yield (≈%) | $CaSO_4$ yield (≈%) |
|---|---|---|---|---|---|---|
| 2 | 9.4 | 88.2 | 2.4 | 85 | 75 | 2 |
| 3 | 2.2 | 89.2 | 8.6 | 93 | 83 | 8 |
| 4 | 1.0 | 69.8 | 29.2 | 96 | 67 | 28 |

Figure 4:
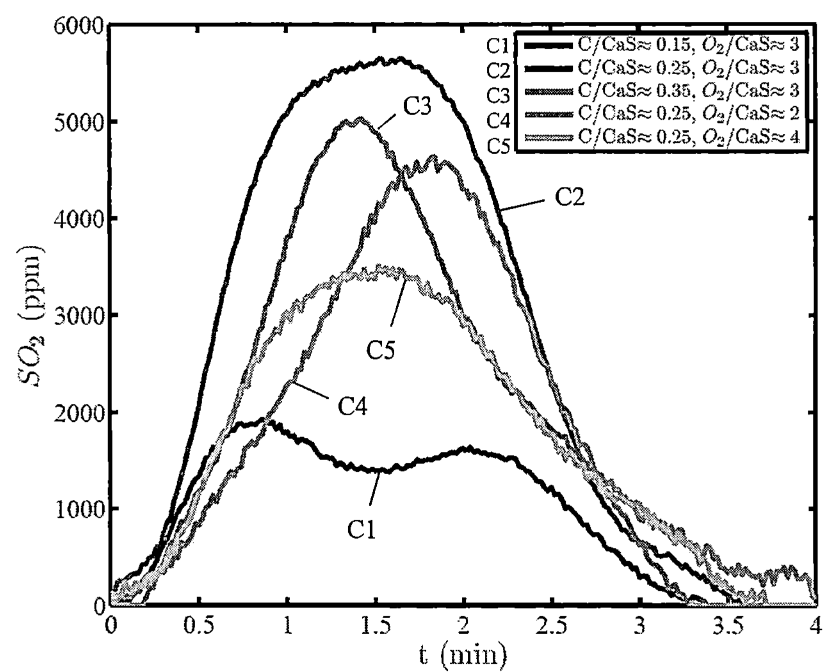
FIG. 4 shows the production of $SO_2$ from CaS decomposition by carbon oxidation in the induction fluidized bed reactor at 1100° C. with a total sample amount of 6 g, for various C/CaS and $O_2$/CaS ratios.

The $SO_2$ formation patterns from all the performed experiments in the fluidized bed reactor are shown in FIG. 4.

As expected based on the above experiments, the maximum $SO_2$ production occurs when $O_2$/CaS≈3 and C/CaS≈0.25 (curve C2).

Higher amounts of either carbon or oxygen hinder $SO_2$ formation while lower amounts result in partial CaS conversion and, thus, less desired gaseous products.

TABLE 5

Coal characterization by CHNS. These characteristics were used in simulations and fluidized bed experiments.

| Compound | wt. % min | wt. % max |
|---|---|---|
| C | 71.5 | 72 |
| H | 4.8 | 5.0 |
| N | 1.7 | 1.8 |
| S | 1.3 | 2.2 |
| O | 8.5 | 8.9 |
| Cl ppm | 369 | 407 |

Note that in simulations, only the carbon content of coal was considered for calculations.

TABLE 6

NAA results for pure coal.

| Element | (ppm) | Element | (ppm) | Element | (ppm) | Element | (ppm) |
|---|---|---|---|---|---|---|---|
| U | 1.33 | V | 39 | Cd | <0.25 | Ni | 17.4 |
| Ti | 633 | Cl | 341 | Au | <0.0018 | Ag | <0.42 |
| Sn | <53 | Al | 13980 | Hf | 0.76 | Sc | 3.2 |
| I | <3 | Ca | 1379 | Ba | 101 | Rb | 14 |
| Mn | 55 | S | 17455 | Br | 3.2 | Fe | 12982 |
| Mg | 880 | Se | 3.5 | As | 26 | An | 26 |
| Cu | <64 | Mo | 46.4 | Sb | 0.61 | Co | 6.3 |
| In | <0.01 | Hg | 0.059 | W | 0.48 | K | 2326 |
| Si | <40000 | Th | <1 | Zr | 39 | La | 8 |
| Na | 342 | Cr | 18 | Cs | 3.1 | | |

REFERENCES

[1] U.S. Pat. No. 6,024,932.
[2] U.S. Pat. No. 4,503,018.
[3] D. Lynch and J. Elliott, "Analysis of the oxidation reactions of CaS," Metallurgical Transactions B, vol. 11, no. 3, pp. 415-425, 1980.
[4] U.S. Pat. No. 5,433,939.
[5] R. Shabou, M. Zairi, and H. Ben Dhia, "Characterisation and environnemental impacts of olive oil wastewater disposal," Environmental Technol., vol. 26, no. 1, pp. 35-45, 2005.
[6] R. Torres-Ordonez, J. Longwell, and A. Sarofim, "Physical transformations during solid calcium sulfide oxidation," Energy and Fuels, vol. 3, no. 5, pp. 595-603, 1989.
[7] D. Lynch and J. Elliott, "Analysis of the oxidation reactions of CaS," Metallurgical Transactions B, vol. 11, no. 3, pp. 415-425, 1980.
[8] U.S. Pat. No. 3,087,790.
[9] C. Cardenas-Escudero, V. Morales-Flarez, R. Parez-Lapez, A. Santos, and L. Esquivias, "Procedure to use phosphogypsum industrial waste for mineral $CO_2$ sequestration," J. Hazard. Mater., vol. 196, pp. 431-435, 2011.
[10] S. Wu, M. Uddin, S. Nagamine, and E. Sasaoka, "Role of water vapor in oxidative decomposition of calcium sulfide," Fuel, vol. 83, no. 6, pp. 671-677, 2004.

The invention claimed is:

1. A process for decomposing calcium sulfide (CaS) into calcium oxide (CaO) and sulfur dioxide ($SO_2$), comprising:

providing a reactor containing calcium sulfide and a source of carbon, oxidizing the source of carbon so as to generate carbon dioxide ($CO_2$), reacting the calcium sulfide with said carbon dioxide so as to produce calcium oxide (CaO), sulfur dioxide ($SO_2$) and carbon monoxide (CO) according to the following reaction:

$$CaS+3CO_2 \rightarrow CaO+SO_2+3CO$$

wherein the oxygen ($O_2$) and carbon (C) contents in the oxidation step are chosen such that:

(i) the mass ratio C/CaS is comprised between 0.15 and 0.35 and (ii) the mass ratio $O_2$/C is comprised between 5 and 25.

2. The process of claim 1, wherein the ratio C/CaS is equal to 0.25.

3. The process of claim 1, wherein the ratio $O_2$/C is equal to 8.

4. The process of claim 1, wherein in the oxidation step the reactor is heated to a temperature comprised between 900° C. and 1200° C.

5. The process of claim 4, wherein the reactor is heated by induction.

6. The process of claim 1, wherein the source of carbon comprises at least one of: coal, coke, charcoal, and shale oil.

7. The process of claim 1, wherein the reactor is a continuous reactor comprising an inlet and an outlet for flowing $O_2$ through the calcium sulfide and the source of carbon.

8. The process of claim 1, wherein the reactor is a fluidized bed reactor or a rotary kiln.

* * * * *